Figures 1, 2:
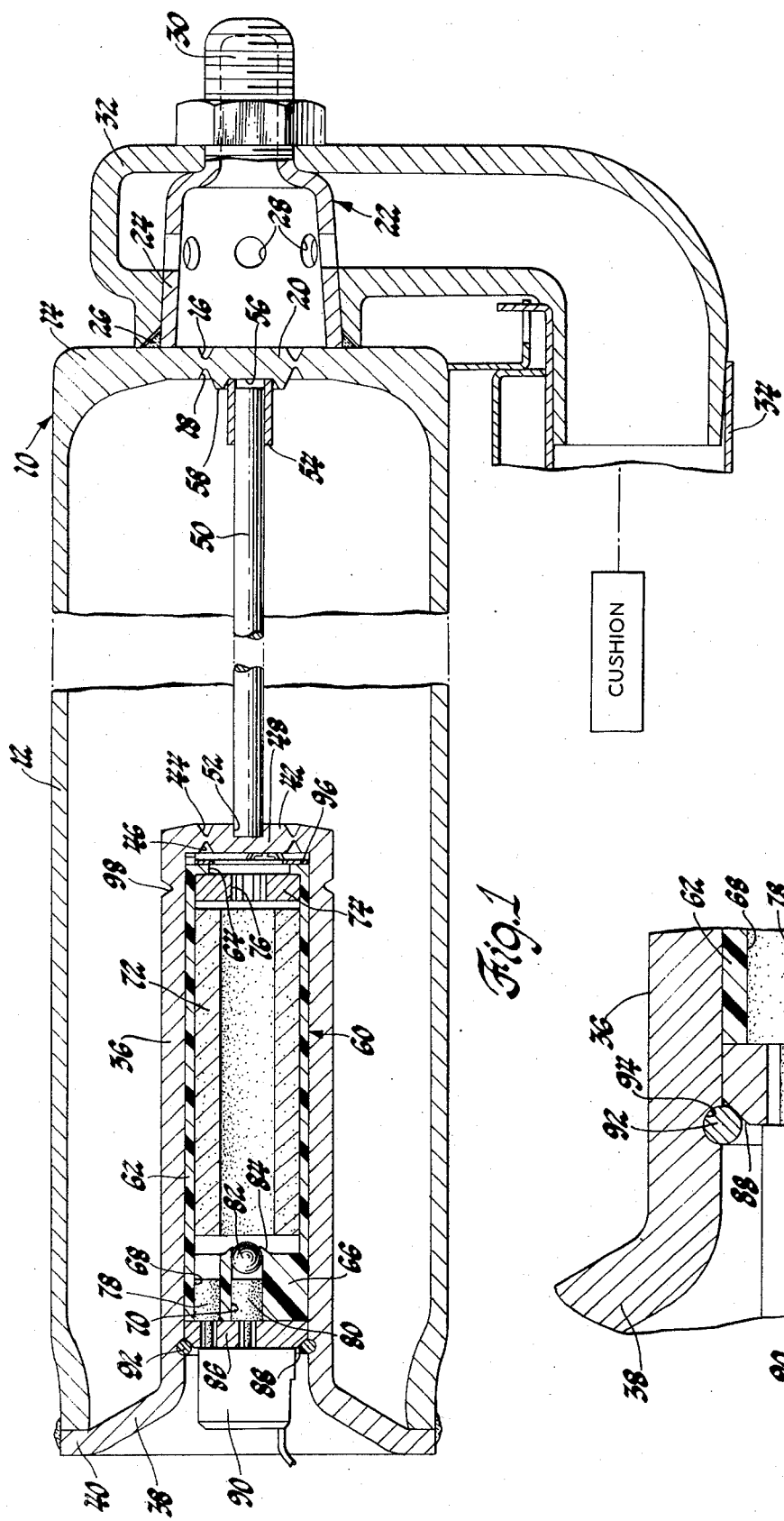

United States Patent [19]
Zeigler

[11] 3,865,273
[45] Feb. 11, 1975

[54] INFLATOR
[75] Inventor: Philip B. Zeigler, Port Clinton, Ohio
[73] Assignee: General Motors Corporation, Detroit, Mich.
[22] Filed: June 25, 1973
[21] Appl. No.: 373,282

[52] U.S. Cl............................... 222/5, 280/150 AB
[51] Int. Cl. ............................................... F17c 7/00
[58] Field of Search ............. 222/3, 5; 280/150 AB; 9/316, 324; 23/281; 137/68, 69; 141/19; 292/256.6

[56] References Cited
UNITED STATES PATENTS
| | | | |
|---|---|---|---|
| 2,959,326 | 11/1960 | Pouliot | 222/5 |
| 3,650,182 | 3/1972 | Phillips | 292/256.6 |
| 3,663,036 | 5/1972 | Johnson | 222/5 X |
| 3,788,667 | 1/1974 | Vancil | 141/19 X |

Primary Examiner—Robert B. Reeves
Assistant Examiner—Francis J. Bartuska
Attorney, Agent, or Firm—Herbert Furman

[57] ABSTRACT

An inflator or either the gas generator or augmented type includes a cylindrical combustion chamber. A cartridge assembly which can be inserted as a unit into the combustion chamber includes a cylindrical plastic housing containing a charge of propellant. One end of the housing is closed by an integral end wall which mounts an igniter for the propellant charge. The other end of the housing is closed by an orifice plate controlling the flow of combustion products from the housing. A seal plate is mounted to the integral end wall of the housing. A semicircular groove in the combustion chamber wall receives a split ring of circular cross section. An angled edge of the seal plate engages the ring to releasably retain the cartridge assembly in the combustion chamber. The angled edge wedges the ring into the groove under the reaction forces.

1 Claim, 2 Drawing Figures

PATENTED FEB 11 1975 3,865,273

INFLATOR

This invention relates generally to inflators of the type having a combustion chamber for generating pressure fluid for inflation of an inflatable occupant restraint cushion. More particularly, this invention relates to a modular cartridge assembly which is preassembled as a unit for ease of installation in the combustion chamber of such type of inflator.

Inflators having a combustion chamber may either be of the augmented type or the gas generator type. In the augmented type inflator, the combustion chamber is contained within a pressure vessel containing a suitable pressurized fluid. The combustion chamber opens to the pressure vessel across a rupturable outlet. In the gas generator type inflator, there is no pressure vessel and the combustion chamber opens across the rupturable outlet directly to the cushion.

In the preferred embodiment of the invention, the modular cartridge assembly includes a cylindrical plastic housing which is generally of the size of the combustion chamber and receives the charge of propellant. One end of the housing is closed by an end wall which mounts an igniter for the charge of propellant. The other end of the housing is closed by an apertured plate which is mounted to the housing and controls the flow of the pressure fluid from the assembly when the propellant charge is ignited. The end wall is provided with a chamfered edge which seats against a circular cross section split ring received within a semicircular groove of the combustion chamber wall to retain the assembly in the chamber.

Thus, the housing, the propellant charge, the igniter for the charge, and the flow control means are preassembled as a unit which can be easily installed in the combustion chamber at the desired stage of assembly of the inflator or the desired stage of assembly of the occupant restraint system of which the inflator is a part. The snap ring retention of the unit permits both ease of installation and removal. Additionally, this retention holds the cartridge assembly within the combustion chamber under the reaction forces which occur when the charge is ignited since the chamfered edge of the end wall tends to wedge the ring in the groove.

One feature of this invention is that it provides a modular cartridge assembly which can be installed as a unit in the combustion chamber of an inflator. Another feature is that the assembly is a preassembled unit of a housing, a propellant charge, an igniter for the charge, and a flow control controlling the flow of pressure fluid from the housing when the charge is ignited. A further feature is that the cartridge assembly is retained in the combustion chamber by a split ring retention which acts to retain the cartridge assembly within the combustion chamber under the reaction forces generated when the propellant charge is ignited.

These and other features of the invention will be readily apparent from the following specification and drawings wherein:

FIG. 1 is a sectional view of an augmented type inflator embodying a cartridge assembly according to this invention; and FIG. 2 is an enlarged view of a portion of FIG. 1.

Referring now particularly to FIG. 1 of the drawings, an inflator 10 of the augmented type includes a cylindrical pressure vessel 12. An integral end wall 14 of the pressure vessel includes coaxial opposed generally V-shaped cross section grooves 16 and 18 which define an integral rupturable outlet 20 of wall 14. An outlet member 22 of tapered configuration has the base wall 24 thereof welded at 26 to wall 14 around the outlet 20. The member 22 includes a plurality of spaced radial openings 28 and an integral externally threaded cylindrical lug 30. The member 22 is received within and bolted to a manifold 32 which in turn communicates with a diffuser 34 of a conventional occupant restraint cushion. Reference may be had to Ser. No. 255,027 Matthews, filed May 19, 1972, and assigned to the assignee of this invention for further details of the manifold and diffuser. When the outlet 20 is ruptured, the stored gas within the vessel 12 as well as the resultant gases from the gas generator, as will be described, flow into the outlet member 22 and thence to the cushion after passing through the openings 28, the manifold 32, and the diffuser 34.

A cylindrical combustion chamber 36 includes an outwardly flaring skirt or end wall 38 which terminates in a peripheral flange 40. The flange 40 abuts against and is welded to the open end of the pressure vessel 12 to close the pressure vessel. The pressure vessel is filled with any suitable pressure fluid or gas, such as argon at 2,400 psi.

An end wall 42 of the combustion chamber includes a pair of opposed V-shaped cross section grooves 44 and 46 which define a rupturable outlet 48 which is coaxial with the outlet 20 of the pressure vessel. A rod 50 has one end thereof received within a bore 52 of the outlet 48 and has the other end thereof frictionally fitted within a sleeve 54. The sleeve 54 is received within a recess 56 integrally formed within the outlet 20 by providing a rib 58 on the inner surface thereof. The purpose of the rod will be hereinafter described, but it will be noted that the rod mechanically connects the outlets 48 and 20.

Received within the combustion chamber is a modular cartridge assembly 60 according to this invention. The assembly includes a cylindrical housing 62 of plastic. One end of the housing includes a partial end flange which defines a cylindrical opening 64. The other end of the housing is closed by an integral end wall 66 of substantial thickness which is provided with a pair of cylindrical bores 68 and 70, the latter being coaxial with the housing.

Contained within the housing is a hollow cylindrical mass 72 of a suitable propellant which produces high temperature, high pressure gases when burned. Propellant such as this is well known and therefore it is not believed that any further details thereof are necessary to an understanding of this invention.

A metal orifice plate 74 is frictionally fitted within housing 62 and seats against the end flange of housing 62. The orifice plate 74 includes a central fluted outlet or orifice 76 which is of predetermined cross sectional area and is coaxial with the bore 70 and the outlet 48.

Contained within the bore 68 is a conventional electrically fired squib or igniter 78 and contained within the bore 70 is a conventional electrically fired squib or igniter 80. A ballistic element or ball 82 of metal is received within the bore 70 slightly ahead of the squib 80. The ball may be a conventional ball bearing and may either be frictionally fitted within the bore 70 or may be retained therein by a flange 84 heat deformed out of the material of wall 66 after the ball has been first inserted in the bore. The ball 82 is coaxial with the bore 70 and the orifice 76.

A seal plate 86 is secured to the wall 66 and is provided with an angled or chamfered edge 88. The seal plate mounts an electrical plug 90 which is electrically connected to the igniters 78 and 80 by wires extending through bores in plate 86. As shown in FIG. 2, a split ring 92 of circular cross section is received within a similar cross section groove 94 of the combustion chamber 36 and is engaged by the edge 88 to retain the cartridge assembly 60 against movement outwardly of the combustion chamber. The cartridge assembly is seated against the split ring by a circular spring 96 which seats against the partial end flange of the housing 62. Spring 96 includes offset legs which resiliently bear against wall 42 adjacent groove 46 to bias the cartridge assembly 60 to the left or outwardly of the combustion chamber 36. This bias seats the edge 88 of plate 86 against the split ring 92.

From the foregoing description, it can be seen that the cartridge assembly 60 can be completely assembled as a unit prior to installation in the combustion chamber 36. The orifice plate 74, the mass 72 of propellant, the ball 82, the squibs 78 and 80 and the plate 86 can be assembled with the housing 62 as a module and this module can thereafter be easily installed within the combustion chamber at the desired stage of assembly of the inflator or of the restraint system. After the cartridge assembly 60 has been inserted within the combustion chamber 36, it is easily retained in place by snapping the ring 92 into the groove 94.

The impact conditions under which the squibs or igniters 78 and 80 are ignited is described in detail in copending application Ser. No. 331,663, Occupant Restraint System, Charles N. Hay, filed Feb. 12, 1973, and assigned to the assignee of this invention. Therefore, no description will be given herein. The squib 78 ignites the mass 72 of propellant and the squib 80 fires the ball 82 into the orifice 76 to restrict the area of this orifice and increase the burn rate of the propellant. The squib 80 and the ball 82 are, of course, not required in all installations of the inflator 10 and, accordingly, may be dispensed with or employed as desired.

When the mass 72 of propellant is ignited by squib 78, there will be a reaction force on the cartridge assembly 60 tending to move the cartridge assembly to the left as viewed in FIG. 1. With reference to FIG. 2, it can be seen that this reaction force will in turn cause the chamfered edge 88 of the plate 86 to tend to force the split ring 92 into the groove 94 to retain the cartridge assembly 60 within the combustion chamber.

When the gases resulting from ignition of mass 72 of propellant reach a predetermined pressure level, the outlet 48 will be severed or ruptured from the combustion chamber so that these gases can flow into the pressure vessel. Simultaneously, the rod 50 will be shifted to the right and moved slightly within the sleeve 54 until it impacts the outlet 20 to sever or rupture this outlet from the pressure vessel so that the pressure vessel contents can flow to the cushion. It will be noted with reference to FIG. 1 that the combustion chamber includes a continuous peripheral groove 98 which provides for pressure relief should the pressure within the combustion chamber 36 exceed a predetermined level for any reason.

Thus, this invention provides a modular cartridge assembly which includes a charge of propellant, a housing for the propellant, an igniter for igniting the propellant, and a flow control member controlling the flow of pressure fluid from the assembly. The assembly can be preassembled as a unit and installed in the inflator at any desired stage of assembly of the inflator or of the restraint system. The split ring retention provides for ease of installation and removal of the cartridge assembly and also acts to retain the cartridge assembly in place when the mass of propellant is ignited by the igniter.

I claim:

1. The combination comprising, an inflator having a pressure fluid chamber and an annular combustion chamber opening at the outer end thereof to atmosphere, means sealing the inner end of the combustion chamber to the pressure fluid chamber, a cartridge assembly including an annular housing having inner and outer ends and containing a gas generating charge of propellant for inflating an occupant restraint cushion, igniter means mounted on the outer end of the cartridge assembly for initiating the charge of propellant, the housing, propellant charge and igniter means being inserted within the combustion chamber or withdrawn therefrom through the open outer end of the combustion chamber, the combustion chamber including a groove opening inwardly thereof adjacent the open outer end thereof, an annular split ring within the groove, and wedge means engaged between the split ring and the outer end of the cartridge assembly, and means coacting between the inner ends of the cartridge assembly and of the combustion chamber to bias the cartridge assembly outwardly of the combustion chamber and engage the wedge means with the split ring, the wedge means applying a wedging force on the split ring to wedge the split ring in the groove under the reaction forces of the cartridge assembly generated by initiation of the charge of propellant.

* * * * *